US009591721B2

(12) United States Patent
Nolan et al.

(10) Patent No.: US 9,591,721 B2
(45) Date of Patent: Mar. 7, 2017

(54) ENHANCING EXPERIENCE OF CONSUMABLE GOODS

(71) Applicant: PHILIPS LIGHTING HOLDING B.V., Eindhoven (NL)

(72) Inventors: Julian Charles Nolan, Pully (CH); Matthew John Lawrenson, Bussigney-Pres-De-Lausanne (CH); Alexander Henricus Waltherus Van Eeuwijk, Eindhoven (NL); Hilbrand Vanden Wyngaert, Grobbendonk (BE); William Nathan Chelton, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/913,034

(22) PCT Filed: Aug. 5, 2014

(86) PCT No.: PCT/EP2014/066759
§ 371 (c)(1),
(2) Date: Feb. 19, 2016

(87) PCT Pub. No.: WO2015/024767
PCT Pub. Date: Feb. 26, 2015

(65) Prior Publication Data
US 2016/0196560 A1    Jul. 7, 2016

(30) Foreign Application Priority Data
Aug. 19, 2013    (EP) ..................................... 13180870

(51) Int. Cl.
*G06F 17/00*    (2006.01)
*H05B 37/02*    (2006.01)
(Continued)

(52) U.S. Cl.
CPC ......... *H05B 37/0236* (2013.01); *F24D 19/10* (2013.01); *G06F 3/16* (2013.01); *G06Q 30/01* (2013.01)

(58) Field of Classification Search
CPC ....... H05B 37/0236; G06F 3/16; G06F 3/162; G06F 3/165; G06F 3/167; H04R 23/008; H04R 29/008
See application file for complete search history.

(56) References Cited

U.S. PATENT DOCUMENTS

| 5,701,117 A | 12/1997 | Platner et al. |
| 6,507,790 B1 | 1/2003 | Radomski |

(Continued)

FOREIGN PATENT DOCUMENTS

| EP | 1553027 A1 | 7/2005 |
| JP | 2001054620 A | 2/2001 |

(Continued)

OTHER PUBLICATIONS

Byron, Ellen, "The Search for Sweet Sounds That Sell; Household Products' Clicks and Hums Are No Accident; Light Piano Music When the Dishwasher Is Done," Wall Street Journal (Online), NY, NY Oct. 2012 (4 Pages).

*Primary Examiner* — Andrew C Flanders (57) ABSTRACT

An apparatus comprises a controller and an input for receiving a signal from a microphone. The controller processes the signal from the microphone to detect a sound associated with the use of a consumable by a user, and generates an output in response to detecting that sound. For example the consumable may be pre-packaged and the sound may be associated with the packaging. In embodiments the controller controls ambient lighting in response to the sound of a first action (e.g. opening the cap of a container), and controls task lighting in response to the sound of a second action (e.g. dispensing the product from the container). In another (Continued)

embodiment the controller detects a sound indicative of the consumable running out (e.g. the hollow sound of the container being put down on a surface), and in response generates a visible indicator or transmits a signal over a network.

16 Claims, 3 Drawing Sheets

(51) Int. Cl.
    *G06F 3/16*     (2006.01)
    *F24D 19/10*     (2006.01)
    *G06Q 30/00*     (2012.01)

(56) References Cited

U.S. PATENT DOCUMENTS

| | | |
|---|---|---|
| 2008/0012722 A1 | 1/2008 | Moseley |
| 2009/0012433 A1* | 1/2009 | Fernstrom ............. A61B 5/1112 600/593 |
| 2009/0166378 A1 | 7/2009 | Stilley |
| 2011/0125063 A1* | 5/2011 | Shalon ................ A61B 5/0006 600/590 |
| 2012/0097012 A1 | 4/2012 | Kurihara et al. |
| 2014/0275748 A1* | 9/2014 | Dunki-Jacobs ...... A61B 5/4839 600/37 |
| 2014/0349256 A1* | 11/2014 | Connor ................. A47G 21/02 434/127 |
| 2016/0022086 A1* | 1/2016 | Yuan ...................... G10L 25/51 700/94 |

FOREIGN PATENT DOCUMENTS

| | | |
|---|---|---|
| WO | 2010058370 A2 | 5/2010 |
| WO | 2012124953 A2 | 9/2012 |

* cited by examiner

ENHANCING EXPERIENCE OF CONSUMABLE GOODS

CROSS-REFERENCE TO PRIOR APPLICATIONS

This application is the U.S. National Phase application under 35 U.S.C. §371 of International Application No. PCT/EP2014/066759, filed on Aug. 5, 2014, which claims the benefit of European Patent Application No. 13180870.1, filed on Aug. 19, 2013. These applications are hereby incorporated by reference herein.

TECHNICAL FIELD

The present disclosure relates to the use of consumable goods (consumables), and to enhancing a user experience associated with the use of such goods in terms of enjoyment and/or usefulness.

BACKGROUND

A "consumable" refers to an article of consumer goods comprising a product which is inherently designed to get used up as part of its normal, intended use, whether through being depleted or being transformed to a non-usable state (not necessarily precluding the possibility of recycling). Typically the product is a substance of which the consumable comprises a finite supply, such as a gas, aerosol, liquid, solution, foam, powder, collection of solid elements, or a dissolvable, digestible or combustible solid, etc., which is used up as an inherent part of the products' normal, intended use. The consumable may also comprise packaging, often being pre-packaged by the manufacturer or supplier. The packaging is opened by the user to access the product, and may itself be either disposable (used up) or re-usable.

Some examples of consumables include: sanitary or ablutionary products, food, stationary, and computer consumables such as printer ink. A further example is skin products, such as moisturizing creams, where the absorption of skin products has been shown to increase with warmer temperatures. The realm of consumables includes Fast Moving Consumer Goods (FMCG) which are defined according to the International Standard Industrial Classification (ISIC) (currently Revision 3).

Consumables may be contrasted for example against durable goods such as computers, phones, TVs or other user terminals; white goods or other household appliances such as cookers, toasters, washing machines, and dishwashers; furniture; and vehicles. Although these will inevitably wear out eventually, durable goods are not designed as such and do not comprise a finite supply of a substance which is used up.

Due to the finite nature of consumables, it is an inherent property of a consumable's intended use that the target user (the consumer) will buy repeated instances of the consumable over a year, month, week or even a day (as opposed to durables which last for over a year or typically multiple years in normal circumstances, and are often guaranteed as such).

Personalisation of consumables and the associated use experience is of growing interest to consumers. For example see "2011 Consumer Packaged Goods Industry Perspective"; Booz&co.; Leslie Moeller, Jose Gregorio Baquero & Elisabeth Hartley (http://www.booz.com/media/uploads/End of Year Letter 2011 consumer.pdf). The user gains a sense of rewarding or indulging him or herself through the consumption of a consumable, and this sense can be enhanced by personalisation or customisation.

SUMMARY

A consumable could be personalised or customised through the simple aesthetic design of the consumable itself. However, the scope of this would be limited and the design would not be able to adapt to the particular circumstances of the consumption by the user, such as the moment at which a certain action or actions associated with the consumption occur, or the moments at which certain related actions occur. It would be desirable to explore technological means to enhance the experience of using a consumable, particularly means that would be capable of reacting to the use of the consumable.

According to one aspect disclosed herein, there is provided an apparatus comprising a controller, and an input for receiving a signal from a microphone. The controller is configured to process the signal from the microphone to detect a sound associated with use of a consumable by a user, and to generate an output in response to detecting said sound. The sound associated with the use may be any sound associated with consumption of the consumable (i.e. using up the consumable), whether this comprises a sound directly resulting from the consumption of the product itself or some other related sound associated with the consumption. For example, the consumable may be pre-packaged and the associated sound which the controller is configured to recognise may result from some action involving the packaging, such as opening the packaging to access the product for consumption, or closing the packaging after consumption.

In embodiments, the sound may comprise a first sound being a sound of a first action associated with use of the consumable, and at least one further sound being a sound of at least one further action associated with use of the same consumable. The further sound is different than the first sound but the further action being related to the first action. E.g. the further sound may be subsequent to the first sound. The controller may be configured to detect the first and further sounds, and to interpret at least one of these in the context of the other. The controller may then generate said output in response to detecting at least one of the first and further sounds.

For instance, the first sound may comprise the sound of a lid or cap of the consumable's packaging being opened, and/or the further sound may comprise a second sound associated with a second action such as the sound of the product being dispensed from the packaging. E.g. the product may comprise a substance such as shaving foam or deodorant and the packaging may comprise a pressurised canister, with the first sound comprising the sound of the cap being popped off the canister and the second sound comprising the sound of the product being dispensed through the nozzle of the canister.

The output may comprise controlling ambient lighting of an environment in which the consumable is consumed, and/or task lighting targeted on a region where the consumable is consumed within the environment. As another example, the output may alternatively or additionally comprise controlling radiant heat in the environment in which the consumable is consumed.

In one embodiment the controller may be configured to control the ambient lighting in response to detecting the first sound (associated with the first action such as opening the packaging), and/or to control the task lighting in response to detecting the second sound (associated with the second action such as dispensing the product). For example the first sound may be used to identify a type consumable—e.g. the brand of the consumable, and/or the type of product which the consumable comprises (i.e. is it shaving foam, shower gel, etc.)—and the controller may use this first identification to set one or more light settings of the ambient lighting corresponding to a desired mood or ambience for the type of the consumable. The second sound may be used to identify a duration and/or type of the activity performed by the user in consumption of the consumable, e.g. to identify the activity as shaving or showering and/or how likely this activity typically lasts. The controller may use this second identification to turn on the task lighting in a corresponding area for the activity (e.g. sink or shower), and/or set the task lighting to a corresponding colour and/or intensity setting for the activity, and/or turn on the task lighting for a corresponding length of time for the activity.

In another embodiment, the further sound may comprise the sound of the consumable running out. For example, this may be the hollow sound of empty or nearly empty packaging of the consumable being put down against a surface. Another example may be the characteristic sound of a pressurized canister running low. The controller may be configured to generate an additional indication of the consumable running out. For example the additional indication may comprise a visible indication to the user (e.g. an alert light such as a separate LED indicator) and/or may comprise transmitting a signal over a network (e.g. to log the fact in a data store such as a server to be acted on by the user, a supplier, or an automated entity of the user or supplier). The further sound may also indicate a filling level or consumption status of the consumable. For example, as it is known that the acoustic resonance inside a container changes with the filling level of the container, and estimate of the filling level may be deduced from the acoustic signature of the sound associated with handling the consumable, such as closing the cap of the consumable package or shaking the consumable container.

In a combination of embodiments, the sound of the consumable running out may be a third sound occurring in addition to the second sound, and the controller may be configured to detect and act upon both the second and third sounds. For example the controller may be configured to control the task lighting in response to the second sound and/or generate the visible or network signal in response to the third sound. The third sound may be subsequent to the second sound.

In further embodiments, the controller may be configured to control the radiant heat (e.g. a radiator, convection heater, infrared heater, IR LED heater, fan heater, storage heater, heat pump, or the like) in response to detecting the first sound. For example the first sound may be used to identify a type of consumable being used would be assisted by the application of radiant heat. The controller may use this first identification to set one or more radiant heat settings of the radiant heat corresponding to a desired level for the type of the consumable.

In a further combination of embodiments, the apparatus may further comprise a presence sensor such as a passive infrared (PIR) sensor, ultrasonic sensor, microwave sensor, time-of-flight (ToF) camera, or the like; and the controller may further comprise a second input for receiving a signal from the presence sensor.

For example, the presence sensor may comprise a motion sensor and the controller may be configured to process the signal from the motion detector to detect a motion associated with use of a consumable by a user, and to generate an output in response to detecting said motion. For example, the motion sensor may be used to identify a motion of the user.

As another example, the presence sensor may comprise a proximity detector; and the controller may be configured to process the signal from the proximity detector to detect a proximity associated with use of a consumable by a user, and to generate an output in response to detecting said proximity. For example, the proximity detector may be used to identify a proximity of the user.

In such embodiments, the controller may be configured to directionally control the radiant heat (e.g. via a directional IR LED heater, directional fan heater, or the like) in response to detecting the motion of a user. For example the first sound may be used to identify a type of consumable being used that would be assisted by the application of radiant heat, and the motion sensor may be used to track a motion associated with the use of the consumable. The controller may then directionally control one or more radiant heat settings of the radiant heat corresponding to a desired level for the type of the consumable.

In further combination of embodiments, the controller may be configured to control the radiant heat in response to detecting the proximity of the user. For example the first sound may be used to identify a type of consumable being used would be assisted by the application of radiant heat. The proximity detector may be used to detect a proximity associated with the use of the consumable. The controller may then control one or more radiant heat settings of the radiant heat corresponding to a desired level for the type of the consumable.

In further embodiments, the controller may be configured to detect the further sound by interpreting it in context of the first sound. This may comprise interpreting the second sound in context of the first sound, and/or the third sound in context of the first sound, and/or the third sound in context of the second sound. For instance the controller may detect the activity associated with the second sound having first identified the brand or type of product from the first sound, and/or may detect the sound associated with the consumable running out having first identified the brand or type of product from the first sound. In one embodiment, the controller may be configured to go back and re-interpret the first sound if no meaningful or sensible match is found for the second sound in context of the first sound. For example if the first sound is initially interpreted as being generated by the packaging of product X, but it is subsequently found that the second sound does not match any of the expected sounds associated with product X, the controller may re-interpret the first sound as a next-best guess product Y for which the second sound does match one of the expected sounds associated with product Y. A similar situation may occur when the first sound is used to link a brand X, but the subsequent second sound does not match with a typical sound of a consumable from brand X.

Note that where any concepts disclosed herein are expressed in terms of an apparatus comprising a controller, these may equally be described in terms of a system comprising the controller and any associated elements, or in terms of a method of performing the operations performed by the apparatus and any associated elements, or in terms of a computer program product comprising code configured to perform the operations of the controller. Similarly where any concepts are disclosed in terms of the steps or operations of a method or computer program, these may equally be expressed in terms of a suitably configured controller or other relevant element.

BRIEF DESCRIPTION OF THE DRAWINGS

To aid the understanding of the present disclosure and to show how embodiments may be put into effect, reference is made by way of example to the accompanying drawings in which.

DETAILED DESCRIPTION OF EMBODIMENTS

As outlined above, the present invention detects a characteristic sound associated with a consumable article and generates an output in response to this detection. The controller thereby enables the experience of consuming the consumable to be controlled in dependence of the consumption, e.g. the moment at which one or more actions associated with the consumption occur, and thus enables the provision of a more customised experience.

In embodiments, the controller uses acoustic analysis of the activation and use of a Fast Moving Consumer Good (FMCG) such as a shampoo or shaving cream to diagnose (i) the product type and/or brand based on a first sound resulting from a first action (e.g. opening the packaging), and (ii) the type and/or duration of activity associated with its use based on a second sound resulting from a second action (e.g. dispensing the product). This allows, for example, ambient lighting to be set in dependence on (i) the product type and/or brand identified from the sound of the first action, and task specific lighting to be set in dependence on (ii) the associated activity identified form the sound of the second action.

Techniques exist for engineering a consumer item to emit a mechanical sound upon use which is both reproducible and characteristic of the item in question. E.g. the packaging of a certain item may be designed to emit a particular sound when that packaging is opened or closed, such as the click or pop of a lid being removed or replaced, and this may be engineered so as to be characteristic of a particular brand. See for instance "The Search for Sweet Sounds that Sell", subtitle "Household Products' Clicks and Hums Are No Accident; Light Piano Music When the Dishwasher Is Done?"; Ellen Byron; Wall Street Journal, Life and Culture; Oct. 24, 2012 (http://online.wsj.com/article/SB10001424052970203406404578074671598804116.html). Another option would be to embed electronics in the packaging (an instance of so-called "smart packaging") so as to emit a certain electronic sound upon use, e.g. when opened and/or closed. Again this sound may be arranged to be both characteristic and reproducible, e.g. being associated with a certain brand or type of product. Another option is to configure the controller to recognise existing characteristic noises of pre-existing packaging.

The present invention exploits the possibility of such characteristic sound to be used as an acoustic signature which may be recognised by suitable signal processing techniques. Suitable algorithms for acoustic signature analysis and diagnosis are in themselves known—for example see (http://www.audioanalytic.com/en/) and U.S. Pat. No. 6,507,790. Optionally, new devices are also becoming available in which the device includes multiple microphones and a directional beamforming algorithm for providing a directional response to the detection of sound, thus reducing interference from unwanted sources. However, as far as the inventors are aware, such sound recognition techniques have never been applied to detecting a signature associated with consumption of a consumable, as it has not previously occurred to anyone in the art that any benefit might arise from doing so.

By using such sound recognition techniques to detect sound associated with the use of a consumable, e.g. opening the packaging, dispensing the product from the packaging, or using, consuming or applying the product itself; it is possible to generate a supplementary output which enhances a user's sense of indulging or rewarding him or herself upon using a portion of the product, or to enhance the sense of satisfaction associated with use of a consumable. For example the colour and/or intensity of ambient lighting may be controlled automatically in response to detecting the sound associated with a certain brand and/or type of product, so as to generate an ambience or mood associated with the brand and/or type of product. Alternatively or additionally, the invention may support and/or enhance the function and/or activity associated with use of the consumable. For example the controller may detect a type and/or duration of activity and automatically control task lighting as appropriate to that activity, e.g. automatically turning on a shaving lamp over a sink lighting for shaving, and/or setting the task light to a certain colour, intensity and/or duration appropriate for shaving.

Today FMCGs such as shampoo, shaving foam or cleaning products are applied using the standard illumination in the room where they are to be applied. Ambient lighting is not tailored to reflect the product type or brand of product being used, nor is task specific lighting adjusted to reflect the product related task being undertaken by the consumer. Accordingly lighting products and FMCG's occupy two separate—and non-overlapping—market areas. No lighting products are known whose characteristics are defined are defined in dependence on a type or use of an FMCG.

Figure 1:
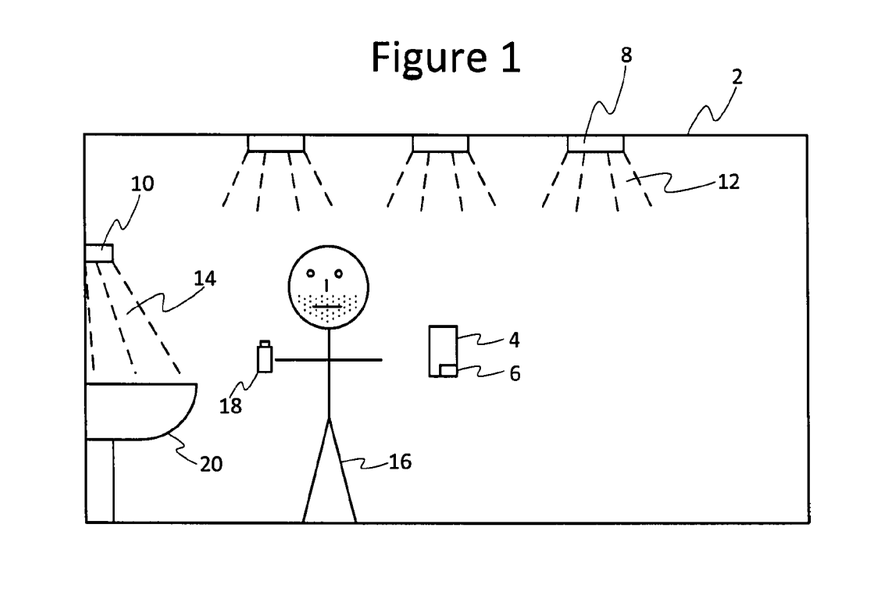
FIG. 1 is a schematic illustration of an environment comprising a lighting system.

FIG. 1 illustrates an example of a lighting system according to embodiments of the present disclosure. The lighting system is installed or otherwise located in an environment 2 where one or more consumables 18 may be used by at least one user 16. The environment 2 may comprise an indoor space such as a room, corridor or hall, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed or partially enclosed space such as the interior of a vehicle. By way of illustration, in the example of FIG. 1 the environment 2 in question is a bathroom.

The environment 2 may comprise ambient lighting 8 in the form of one or more luminaires arranged to emit ambient light 12 into the room and thereby illuminate that environment, preferably illuminating substantially the whole environment 2, e.g. the whole room. Typically the ambient lighting 8 comprises one or more luminaires mounted on the ceiling of the room. The environment 2 may alternatively or additionally comprise task lighting 10 which is targeted on a specific region where the consumable 18 is to be used, i.e. a specific zone or area within the environment 2 (so smaller than that environment 2) where a task involved in the consumption is performed by the user 16. The task lighting 10 comprises one or more task specific luminaires arranged to emit targeted light 14 selectively into the region in question. The task specific lighting 10 may be targeted in the region in question in that it is directional, or simply by means of its placing and relative range of illumination within the room. For instance in the example of FIG. 1 the consumable 18 comprises a canister of shaving cream or foam to be used around a sink 20. In this case the task lighting 10 may comprises one or more luminaires arranged to emit light into a region associated with the sink 20 and thereby illuminate that region, e.g. a luminaire located over the sink and/or over a mirror on the wall behind the sink.

It will be appreciated that this is just one example, and the teachings below may apply to other consumables 18 and/or in other environments 2, e.g. pre-packaged food being opened and/or prepared in a kitchen with task specific lighting over a cooker and/or work surface, or makeup being used in a bedroom with task specific lighting over a dressing table.

The consumable 18 comprises a consumer product and typically also comprises packaging. The consumable 18 may be packaged or otherwise arranged such that a distinct acoustic signature is generated when the consumable 18 is prepared for use through a first action by the consumer. For example the first action may comprise opening the packaging, such as opening a cap on shaving foam, opening a box of wet wipes; and/or another preparatory action such as shaking the can of shaving foam. A sound of this first action can be used to identify for example the brand of the product, the product type, and/or its location.

The consumable 18 may also be arranged to generate a distinct acoustic signature when the product is applied through a second action by the consumer. For example the second action may comprise applying the product by dispensing it from its packaging, such as shaving foam being expelled from container or removing a wet wipe from the box; and/or another action of use such as the shaving foam being used for shaving by the user 16, the wet wipe(s) being used to clean a surface. This second action can be used to identify for example the nature of an activity performed by the user comprising or associated with the second action, the duration of the user's activity, and/or the location of such activity.

The lighting system comprises a control system 4 comprising at least one microphone 6 (or a plurality of microphones for directional response). In embodiments the lighting system 4 may also be provided with network connectivity. For example, the control system 4 may take the form of a wall-mounted control unit; or a mobile terminal such as a smart phone, tablet or laptop running a suitably configured application; or a distributed system distributed throughout a building, plurality of buildings or plurality of sites. In the case of a unit or terminal formed within a discrete housing, the microphone(s) 6 may be internal or external to the housing. The control system and microphone may also be part and/or integrated with the lighting 8 and/or 10.

Figure 2:
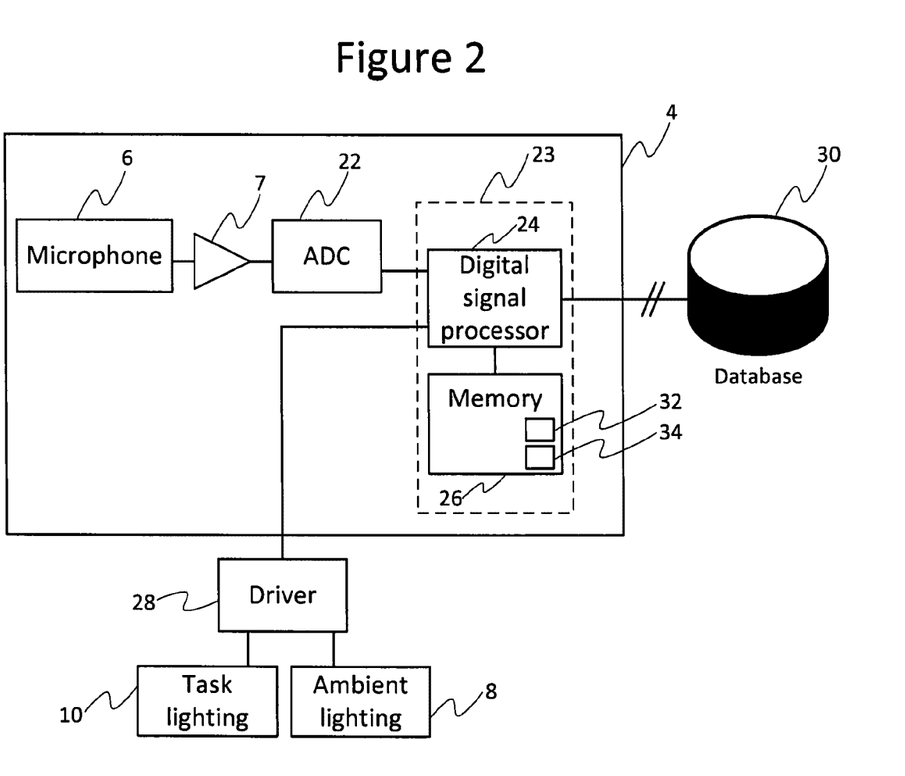
FIG. 2 is a schematic block diagram of a lighting system including an expanded block diagram of a controller for controlling the lighting system.

FIG. 2 provides a block diagram showing elements of the control system 4 in more detail. The control system 4 comprises at least one microphone 6 for recording a sound related to the consumable 18, an amplifier 7, an analogue to digital converter (ADC) 22, and a controller 23 coupled to the microphone(s) 6 via the amplifier 7 and ADC 22, the controller 23 being arranged to receive a signal from the microphone(s) 6 representing sound captured by the microphone(s) 6 from the environment 2 and thereby to record at least a portion of that sound. The following will be described in terms of just one microphone 6, but in embodiments the teachings below may alternatively be implemented with an array of two or more microphones 6 in conjunction with beamforming techniques to target the detection on sound from a particular direction (and thereby on sounds from a region in which a particular action or actions associated with use of the consumable 18 is or are expected to take place). Note also that if the control system 4 comprises a unit or terminal having a discrete housing within which the controller 23 is formed, the microphone(s) 6, amplifier 7 and/or ADC 22 may be internal or external to the housing, or the ADC and controller 23 may be integrated into a microprocessor or microcontroller.

The controller 23 comprises a sound analyser 32 configured to determine an acoustic signature from the recorded sound, for example based on spectral analysis such as by a Fast Fourier Transform or other transformation into the frequency domain. The sound analyser 32 may take the form of signal processing software stored on a memory 26 of the controller 23 and arranged to be executed on a processor 24 of the controller, so as when executed to perform operations to detect sound such as in accordance with the following. Alternatively it is not excluded that some or all of the signal processing involved in this is implemented in dedicated hardware circuitry, or configurable or re-configurable hardware circuitry such as a programmable gate array (PGA) or field programmable gate array (FPGA).

The controller 23 is coupled to or comprises a relational database 30, storing acoustic signatures versus product data (i.e. storing one or more signatures mapped in association with respective product data for one or more consumables 18). This database 30 enables determination of one or more product characteristics such as type, brand, typical use, etc. based on an acoustic signature. In embodiments the database may be implemented at a remote location, e.g. one or more remote servers, and accessed by the controller 23 via a network 30, e.g. a public or private local area network such as a wireless local area network, or a local or wide-area private intranet, or a wide-area public inter network such as the Internet. Alternatively it is not excluded that some or all of the database 30 is comprised locally at the control system 4, e.g. locally in the memory 26 of a stand-alone wall-mounted unit or of a control system implemented on a mobile terminal such as a smart phone, tablet or laptop.

The controller 23 further comprises a lighting control module 34 configured to adapt the ambient lighting 8 and/or task lighting 10 based on the determined product characteristics and/or product use associated with the acoustic signature of the recorded sound. The lighting control module 34 may again take the form of software stored on the memory 26 of the controller 23 and arranged to be executed on the processor 24 of the controller 23, so as when executed to perform operations to control lighting based on the detected sound, such as in accordance with the following. Alternatively it is not excluded that some or all of the control functionality involved in this is implemented in dedicated hardware circuitry, or configurable or re-configurable hardware circuitry such as a PGA or FPGA.

The lighting system also comprises one or more drivers 28 for driving the ambient lighting 8 and/or task lighting 10. The drivers 28 may comprise a driver for each of the luminaires forming the lighting 8, 10, or a driver for each kind of lighting or kind of luminaire. The driver(s) 28 may be considered part of the control system 4 or part of the one or more luminaires forming the lighting 8 and/or 10. If part of the control 4 system, then in the case of a unit or terminal formed within a discrete housing, the driver(s) 28 may be internal or external to the housing. If part of a luminaire, a driver may be internal or external to the housing of that luminaire.

According to embodiments disclosed herein, the controller 23 is configured to adapt the ambient lighting 8 to reflect the brand attributes of a product used by a consumer, and to adapt the task lighting 10 to reflect the task being carried out by a consumer whilst using the product. It uses acoustic analysis of the activation and use of an FMCG such as a shampoo or shaving cream to diagnose (i) the product type and brand based on detecting the acoustic signature of a first action, e.g. the sound of opening the consumable's packaging, and (ii) the type and duration of an activity associated with its use based on detecting the acoustic signature of a second action comprising or associated with that activity, e.g. the sound of dispensing and/or using the product comprised by the consumable. This allows the ambient lighting 8 to be set in dependence on the product type and brand, identified from the first action, and the task specific lighting 10 to be set in dependence on the associated second action.

There are at least two alternative ways to facilitate this. One way is to provide a container for an FMCG or other product engineered such that it makes a unique—but repeatable—sound upon opening. The consumable is acoustically engineered such that it emits a sound upon a first action being performed, which sound's acoustic signature is unique to a particular product type and/or brand, but which is also repeatable between items of the same type and/or brand. This may be achieved by engineering (for example) a cap of the packaging and its associated retaining structure. E.g., the cap can be constructed so as to resonate at different frequencies when removed from the retaining structure, to have different decay times, different numbers of impulses, etc.

Another way is to use the sound of a pre-existing consumable and associate the acoustic signature of these sounds with brand and product type information in the barcode of the pre-existing consumable during a "learning phase".

Either way, the sound is detected by at least one of the one or more microphone(s) 6. The sound analyser 32 running on a Digital Signal Processor 24 is then used to convert the signal into the frequency domain using a Fast Fourier Transform and the magnitude of the frequency components are stored at successive time intervals such that a time variant frequency analysis or acoustic signature of the sound is obtained to determine both (i) the product type and brand (based on the first action) and (ii) the type and duration of activity associated with its use (second action).

These acoustic signatures are then compared against reference signatures for the first action and second action. This acoustic signature is analysed and compared to a range of acoustic signatures which are held in the database 30, which contains a mapping of first action acoustic signatures to brands and product types, and ambient light settings which are associated with these. The acoustic signature of the second action is also analysed and compared to a range of acoustic signatures which are held in the database 30, which contains a mapping of the second action acoustic signature to corresponding actions which may be associated with the brand and product identified by the acoustic signature of the first action, and also a mapping to task light settings associated with the second action signatures. The analyser 32 may make the diagnosis of the second action in the context of the first action to produce a more accurate contextual match.

Based on such embodiments, the digital signal processor can analyse the acoustic signatures produced by first action and second action to a level where they can be correctly identified, with an acceptable number of false positives or negatives, from a database containing a plurality of similar signatures.

Optionally, if the second acoustic signature cannot be matched against a corresponding action in the context of the first acoustic signature, then the first acoustic signature may then be re-mapped against the first action database and the analysis of the second acoustic signature re-executed in the context of the re-mapped first acoustic signature. Alternatively the first acoustic signature may be re-mapped against the first action database in the context of the second acoustic signature. If a second action can only be diagnosed independently of the first action, then the first action and second action may be diagnosed according to the best fit against the reference for both actions, and the record of the diagnosis of the first sound updated appropriately. E.g. the sound analyser 32 may be configured to output a confidence value or probability for recognising a sound, and the best diagnosis for the first and second sounds may be selected together in a manner that gives the best combination of confidence values for the first and second sound according to some suitable fitting criterion or algorithm (e.g. minimises mean or means square error or the like, where the "error" for each sound may be for instance the difference between 100% confidence and the confidence value for the selected diagnosis of that sound, or the difference between the confidence value for the selected diagnosis and the maximum confidence value that would be possible for the sound if diagnosed in isolation).

In embodiments, a generic (i.e. unbranded) product type may exist, and certain actions may be carried out if the probability of a match is low (e.g. ignore, default setting etc.). For example if the confidence value for recognising a certain sound or sounds is below a threshold, the sound analyser 32 may determine that no meaningful recognition is possible. In this case the controller 23 may apply default settings for the ambient and/or task lighting. If only one of the sounds can be recognised, the controller 23 may apply a default action that depends on the recognised sound. E.g. if only the brand can be recognised from the first action, but not the type of action from the second, then the controller 23 may apply default task lighting 14 for the identified brand. Or if only the type of action can be recognised but not the brand, the controller 23 may apply default ambient lighting 12 for the identified type of action.

As another option, new entries can be added to the first action database by the user in a "learning mode". Here the system can "learn" the acoustic profile of products not already included in the database. A similar learning approach may also be applied to the second action database, and even a third action database.

Thus ambient and task light settings are associated with the reference signatures for the first action and second action. When a match is identified for the first action, a signal is passed to the lighting control module 34 which sets the ambient light setting in dependence on the diagnosed first action. Similarly when the second action is identified, the corresponding task light setting for the second action is loaded to the lighting control module whilst the second action is being performed. After the activity comprising or associated with the second action ceases, both the ambient and task lighting return to their default settings.

Such embodiments advantageously enable ambient light 12 to be adapted to reflect the brand attributes of a product used by a consumer, and task light 14 to be adapted to the task being carried out by a consumer whilst using a product. Actions associated with different FMCG's may be provided with lighting that (i) is specific to the product and (ii) adapted to the task being carried out.

This may be applicable across a wide range of products, e.g. shaving, cleaning and other FMCG's can benefit from task specific lighting conditions which differ from that usually encountered. Cleaning materials may benefit from white light, shaving may require a direct light, and beauty products may require a direct white light for application and a destination light for testing. The apparatus may also be applicable in the field of medication where the characteristic sound of blister packs or dissolving effervescent tablets can be used to trigger specific lighting (e.g. task light for reading the information/instruction leaflet); use of drinking or eating products where for example the sound of opening beverage cans or bear bottles can provide a brand indication (such as a particular brand of cola or beer) and therewith set a proper ambient light; use of food products for cooking etc.

For instance, the ambient light setting may be triggered by the acoustic signature of opening a product's packaging and the task light may be triggered by the acoustic signature of the use of the product. In one example the ambient light setting may reflect the brand of the product, e.g. bluish ambient for a certain brand of shaving foam, and the task light may assist the use of the product at the location where the product is used and during use of the product, e.g. front illumination of the face during shaving.

To give an example use case, a user washes in normal bathroom lighting. The use then opens a can of shaving foam of a certain brand X. The consumable is identified by the lighting system as being brand X shaving foam and adjusts the ambient and task lighting for the product. The user then releases some shaving foam and starts shaving. The acoustic signature of this activity is used to tailor the task specific lighting to the specific activity. When the cap is replaced on the product (or the activity acoustic signature related to its use is no longer detected) the light settings are returned to their default setting).

In another example, the type and start of ambient and the task light may be both triggered by the acoustic signature of opening a product's packaging, and a reset of the ambient and task light may be triggered by the acoustic signature of closing the packaging. In one example, the acoustic signature of opening a mascara container may reveal the brand of the mascara and trigger the use of the mascara—and hence sets both ambient and task light simultaneously—whereas the acoustic signature of closing the mascara container may indicate the end of the activity—and hence resets both the ambient and task light.

Further use cases may be based on sounds created by devices which can be associated with consumables and/or may be related to the use of consumable, such as for example the sound of opening a fridge where food is stored, the sound of switching on a cooker or cooker hood for preparing food, the sound of opening the door of a washing machine for subsequent dosing of soap or the sound of turning on the shower which may be linked to the subsequent use of a shower gel. As these devices may be considered to be associated with the use of consumables, they may trigger the generation of an output signal, e.g. an ambient light, in preparation of the use of the consumables. A further advantage of interpreting the sound of such devices is that they can also be used to define the context for interpreting subsequent further sounds such as the removal of a packaging from food or the opening of a shower gel container.

The actions associated with an acoustic signature may be defined as a function of the first or subsequent acoustic events. E.g. if the first acoustic event indicates that a certain brand of shaving foam is used, it may be determined that a total of up to five subsequent acoustic events may be associated with the product, the lighting actions associated with each acoustic event being associated in the context of preceding events. For example, the first event might be the opening of the can, which sets the ambient light—but based on the product type diagnosed it is computed that a further two acoustic events (ejection of the shaving foam and closing of the can) will occur before the consumers applies the product. Hence it is only on the fourth acoustic event (the application of the foam) that the task specific lighting is set. The fifth (or absence of subsequent) acoustic event indicates the end of the application (in this case, the acoustic event can be defined as the sound of water cleaning the razor, for example).

Additionally, at a general system level it is disclosed to use acoustic signatures to determine the brand and/or type of product being deployed by a consumer and then to diagnose characteristics relating to its use, which may involve engineering the packaging of the FMCG as well as providing the electronic system to detect and diagnose two related acoustic profiles.

In another alternative or additional embodiment, the system 4 may be configured to provide an indication of when a product is running out, e.g. to alert the user when to buy a replacement, through lighting or other means. The sound analyser 32 and database 30 of the controller 23 may be configured to diagnose a state of use of the FMCG container (e.g. full, half full, empty etc.). This may be achieved by using the microphone 6 to detect a signature associated with this third action, such as by diagnosing the acoustic resonance when the container is placed on a hard surface or when closing the container. In response, the controller 23 controls a suitable indictor or indicators for the benefit of the consumer, thus giving an indication to the user as to the consumable's status, e.g. through a blinking light and/or communicating this information across a network.

The controller 23 may be configured to process this third action in the context of the first action and/or second action. For example where the acoustic signature of the third action represents the resonance of the FMCG container when it is placed on a surface, this will vary according to how full the container is. These differences may be detected and diagnosed and control the ambient, task or other light to provide a visual indication of the status of the container (full, half full etc.). Another option is for this information to be communicated to any networked device, e.g. to record the fact on a server so the user will receive an alert by email or IM message, or when he or she next logs onto an online account, or the like.

Figure 3:
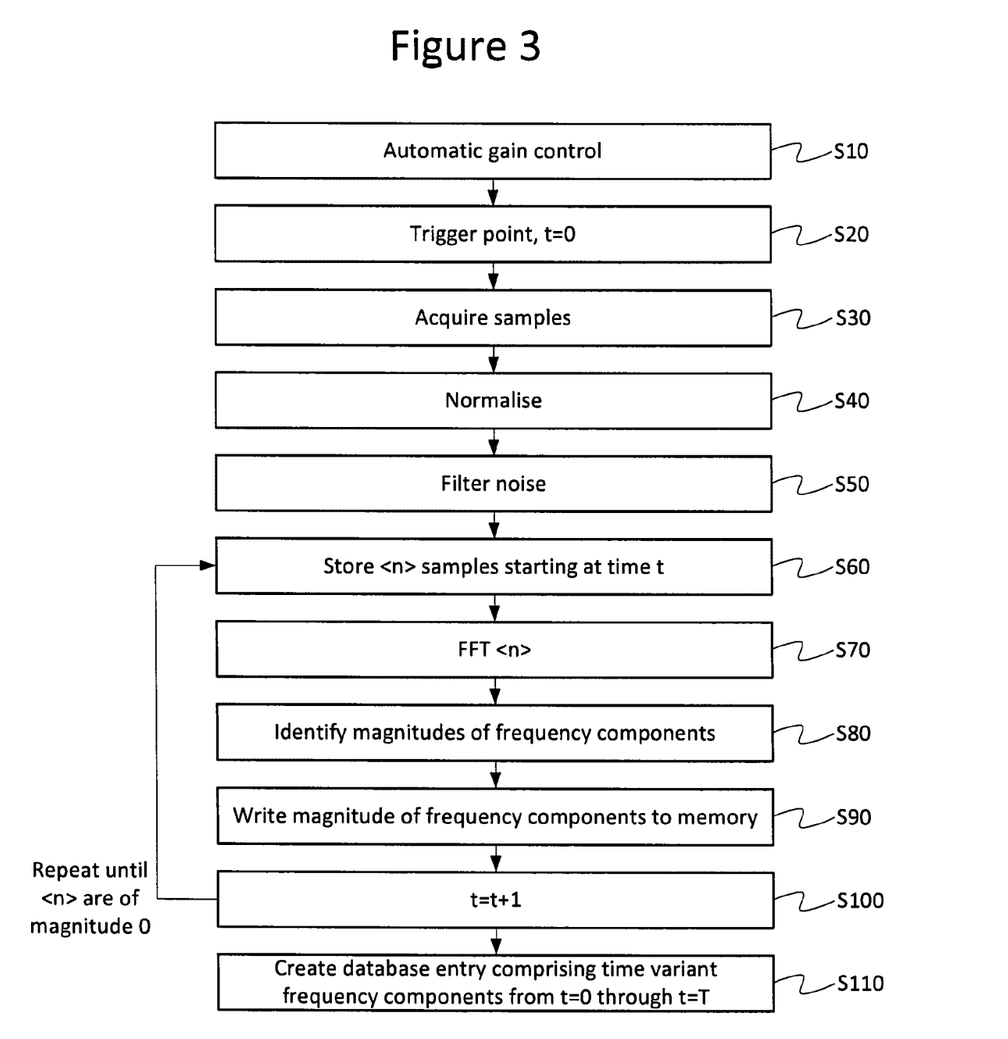
FIG. 3 is a flow chart showing an example method for recognising consumables by sound.
Figure 4:
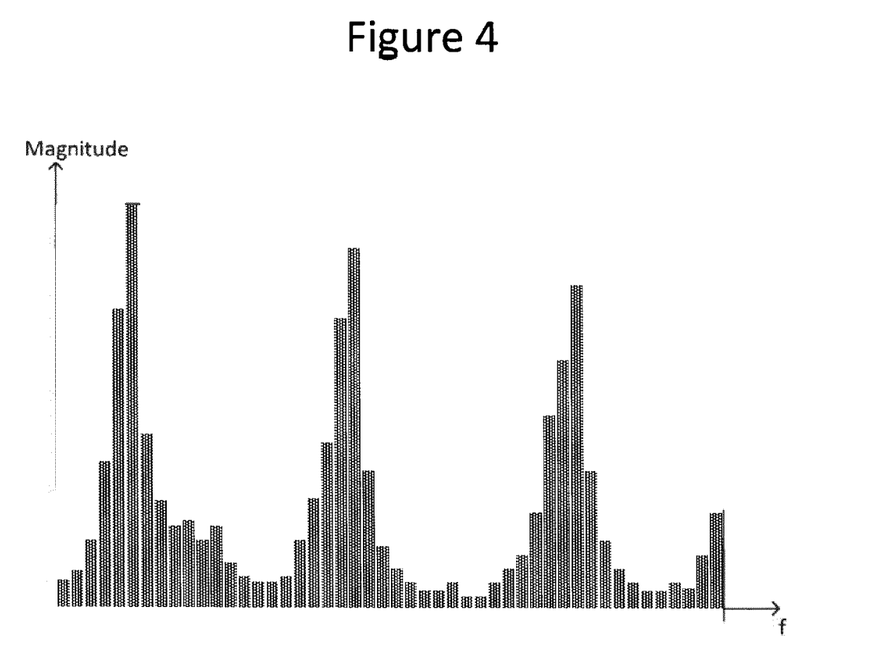
FIG. 4 is a schematic sketch of a plurality of frequency components representing a sound in the frequency domain.

FIGS. 3 and 4 exemplify a possible algorithm for the diagnosis of acoustic signatures from the sounds of the first and second actions (a similar approach will also work for the measurement of the container resonance resulting from the third action).

At step S10 an automatic gain control is applied to the incoming signal from the microphone 6 by adjusting the gain of the amplifier 7. At step S20 a trigger point is defined relative to the incoming signal, defining time t=0. At step S30 the sound analyser 32 acquires samples from the incoming signal in the time domain. At step S40 the analyser 32 normalises the samples to a normalised level. At step S50 the analyser 32 applies a noise filtering operation to the samples. The sound analyser 32 thus obtains a set of time domain samples representing the input signal. At step S60 the analyser 32 stores a subset <n> of these time domain samples in memory 26, representing a portion of the input signal over a window of time, the window being indexed as t=0. At step S70 the analyser applies a frequency domain transform to transform the <n> time domain samples into the frequency domain. For example the transform may be a Fourier transform such as a Fast Fourier Transform (FFT), or a discrete cosine transform, or other. This results in a set of samples in the frequency domain, as illustrated schematically and by way of example in FIG. 4. Each frequency domain sample comprises a certain magnitude value at a respective frequency, thus representing the signal in terms of its magnitude at different frequencies in the frequency spectrum. At step S90 the analyser 32 stores these frequency domain samples in memory 26. At step S100 the analyser increments the time index t by +1, so as to progress to a subsequent time window of the incoming signal from the microphone 6. The sound analyser 32 then repeats steps S60 to S100 until a certain, suitably large number of windows have been capture at time t=T. The sound analyser 32 thus has stored a representation of the spectrum of the input signal over each of a plurality of time windows. This provides a time varying spectral representation of the input signal. At step S110 the sound analyser 32 compares this against the signatures stored in the database 30 to determine whether a match is found.

An alternative would be to apply a matched filter in the time domain to match a template signature against the incoming signal.

In further embodiments, as an alternative to or in addition to the lighting, the system may comprise one or more heaters, e.g. IR LED heaters, for providing radiant heat. The controller may then be configured to control the radiant heat in response to the first and/or further sounds in a manner similar to described in the foregoing embodiments. For instance, the system may identify when consumables that would be assisted by the application of radiant heat are being used. The system may further identify when consumables that would benefit from any 'post application' treatment are being used, i.e. products for which an additional control of the lighting and/or radiant heat is required after discontinuation of use. In response, the controller may then activate the heating or control the direction of the heating accordingly.

Additionally, the system may comprise a presence sensor for sensing presence of a user in the environment 2. In this case the controller 23 may be configured to activate and/or adapt the direction of the heating and/or lighting in dependence on both the recognized sound and the detected presence. This would allow, for example, the application of task lighting and/or radiant heat to be controlled in a more suitable manner, e.g. as a user applies lipstick the motion may be matched by the radiant heat.

For example, the presence sensor may comprise a proximity sensor. The radiant heat may then be controlled in response to signals from the proximity sensor. In this case the controller 23 may be configured to activate and/or adapt the direction of the heating and/or lighting in dependence on both the recognized sound and the detected motion or proximity. For example, this would allow a more consistent radiant heat level at the user's location, even if the user's distance from the IR LED heater changes.

As an example use case, a user washes in normal bathroom lighting. The user then opens a lipstick container of a certain brand Y. The consumable is identified by the system as being brand Y lipstick and that this product requires 'post application' treatment of continued radiant heat for a period of time. As the user then applies the lipstick, the motion of this activity is tracked by the motion sensor used to tailor the direction of the radiant heat to the specific activity. When the cap is replaced on the product (or the activity acoustic signature related to its use is no longer detected) the radiant heat continues at the desired 'post application' treatment level for the period of time. It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Apparatus comprising:
a controller, and
an input for receiving a signal from a microphone;
wherein the controller is configured to process the signal from the microphone to recognize a sound associated with use of a consumable by a user, wherein the sound comprises a first sound being a sound of a first action associated with use of the consumable, and at least one further sound being a sound of at least one further action associated with use of the same consumable, the further sound being different than the first sound but the further action being related to the first action;
wherein the controller is configured to recognize the first and further sounds, and to generate an output in response to recognizing at least one of the first and further sounds.

2. The apparatus of claim 1, wherein the further sound is subsequent to the first sound, and the controller is configured to recognize the further sound by interpreting the further sound in context of the first sound.

3. The apparatus of claim 2, wherein the controller is configured to re-interpret the first sound in context of the second sound if no match is found for the second sound in the context of the first sound.

4. The apparatus of claim 1, wherein the controller is configured to identify a brand and/or product type of the consumable based on the recognition of the sound, and to generate the output in response to the identification of the brand and/or product type.

5. The apparatus of claim 1, wherein the controller is configured to identify the brand and/or product type of the consumable based on the recognition of the first sound, and to interpret the further sound in the context of the first sound by interpreting the further sound in context of the brand and/or product type.

6. The apparatus of claim 1, wherein the output comprises controlling ambient lighting of an environment in which the consumable is used, and/or task lighting targeted on a region where the consumable is used within the environment.

7. The apparatus of claim 1, wherein the controller is configured to control the ambient lighting in response to recognizing the first sound.

8. The apparatus of claim 4, wherein the controller is configured to control the ambient lighting in response to the identification of the brand and/or product type.

9. The apparatus of claim 1, wherein the further sound comprises a second sound being a sound of a second action associated with use of the consumable, and the controller is configured to control the task lighting in response to recognising the second sound.

10. The apparatus of 9, wherein the controller is configured to identify a type and/or duration of a user activity based on the recognition of the second sound, and to control the task lighting in response to the identification of the type and/or duration of the user activity.

11. The apparatus of claim 1, wherein the sound comprises a sound indicative of a consumption status of the consumable, and in response the output comprises an additional indication of the consumable's consumption status.

12. The apparatus of claim 1, wherein the further sound comprises a third sound being the sound indicative of the consumable running out, and the controller is configured to generate said additional indication in response to the third sound.

13. The apparatus of claim 1, wherein the consumable is pre-packaged and the sound is associated with an action involving the packaging.

14. The apparatus of claim 1, wherein said output comprises controlling heating in an environment in which the heating is used.

15. The apparatus of claim 6, further comprising an input for receiving a signal from a presence sensor for sensing presence of a user in said environment, wherein the controller is configured to control the lighting and/or heating in further dependence on the sensed presence.

16. A computer program product comprising code embodied on a non-transitory computer-readable medium and configured so as when executed on one or more processing units to perform operations of:
    receiving a signal from a microphone,
    processing the signal from the microphone to recognize a sound associated with a use of a consumable by a user, wherein the sound comprises a first sound being a sound of a first action associated with use of the consumable, and at least one further sound being a sound of at least one further action associated with use of the same consumable, the further sound being different than the first sound but the further action being related to the first action;
    recognizing the first and further sounds, and
    generating an output in response to recognizing at least one of the first and further sounds.

* * * * *